Figure 1:
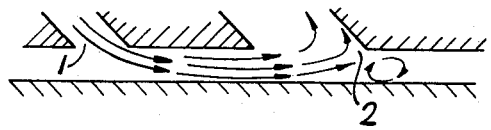

Jan. 12, 1965   W. J. EGGINGTON ETAL   3,165,159
VEHICLES FOR TRAVELLING OVER LAND AND/OR WATER
Filed March 10, 1961   2 Sheets-Sheet 1

Inventors
W. J. EGGINGTON
E. G. TATTERSALL
By Cameron, Kerkam & Sutton
Attorneys

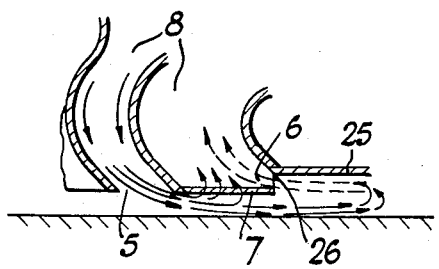
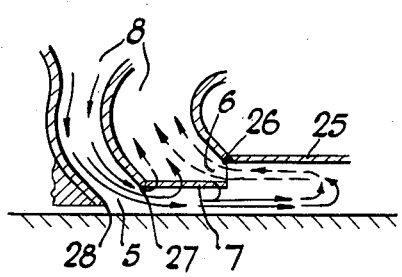
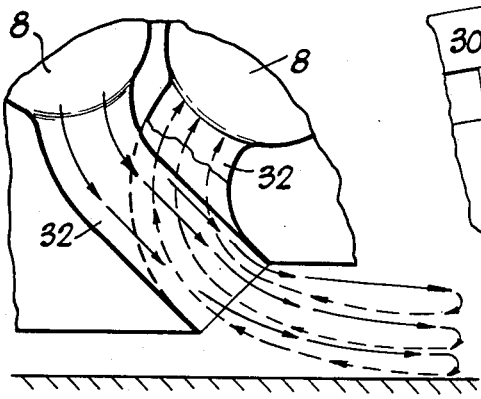
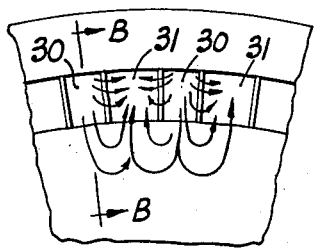
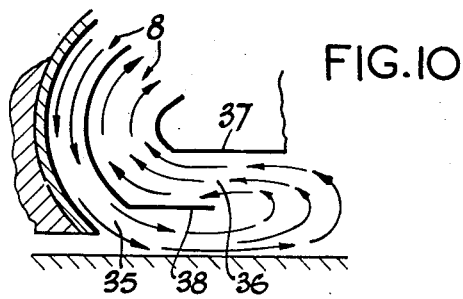
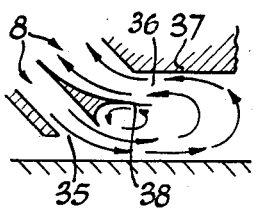
Inventors
W. J. EGGINGTON
E. G. TATTERSALL
Cameron, Kerkam & Sutton
Attorneys United States Patent Office 3,165,159
Patented Jan. 12, 1965

3,165,159
VEHICLES FOR TRAVELLING OVER
LAND AND/OR WATER
Wilfred James Eggington and Edward G. Tattersall, Southhampton, England, assignors to Hovercraft Development Limited, London, England, a British company
Filed Mar. 10, 1961, Ser. No. 94,736
Claims priority, application Great Britain, Mar. 16, 1960, 8,685/60
13 Claims. (Cl. 180—7)

This invention relates to vehicles of the type which in operation are at least partly supported over a surface by a cushion of pressurised gas formed and maintained beneath the vehicle by at least one curtain of fluid issuing from the bottom of the vehicle, and in which at least part of the fluid forming the curtain or curtains is recovered through a port or ports, hereinafter referred to as the recovery port or ports. Such vehicles are described in the U.S. application of Christopher Sydney Cockerell Serial Nos. 809,699 and 837,428, filed April 29, 1959 and September 1, 1959, respectively, both applications now abandoned.

In such vehicles, the fluid forming the curtain or curtains normally issues from a port or series of ports, hereinafter referred to as the supply port or ports, formed in the bottom of the vehicle.

When operating at low heights, for example when the recovery port is at or below a height from the surface equal to the width of the supply port, the width of the supply port being the distance between the inner and outer edges of the port, such as may occur when taking off and landing, or when local clearance is small when passing over an obstacle, instead of the curtain forming a cushion of pressurised fluid, and being deflected by this cushion so as to enter the recovery port smoothly, there is a tendency for the curtain to impinge on the inner side of the recovery port, or ports. Inefficient recovery of the fluid occurs and any cushion formed is of a low pressure.

The difficulty of obtaining efficient recovery of curtain forming fluid may be reduced by providing an arrangement of supply and recovery ports such that, when the vehicle is wholly or locally at a low operating height, at least part of the curtain fluid can flow substantially horizontally past the inner edge of the recovery port or ports so that any cushion of pressurised fluid formed can act on that part of the curtain fluid and deflect it back into the recovery port or ports.

According to the invention there is provided a vehicle for travelling over a surface which in operation is at least partly supported above the surface by a cushion of pressurised gas formed and contained beneath the vehicle by at least one curtain of fluid issuing from at least one supply port in the bottom of the vehicle, at least part of the fluid forming the curtain being recovered into the vehicle through at least one recovery port in the bottom of the vehicle, wherein the recovery port is positioned relative to the supply port so that at low operating heights at least part of the fluid forming the curtain flows inwardly past the recovery port towards the gas cushion, is deflected round and outwardly by the gas cushion and flows to the recovery port in a substantially horizontal direction.

The flow of fluid past the recovery port can be facilitated by making the recovery port as a series of separated discrete ports. According to a feature of the invention there is provided a vehicle as described above wherein the recovered fluid is recovered through a series of individual ports spaced apart in an annular configuration, whereby at least part of the fluid forming the curtain can flow inwards between the individual ports towards the gas cushion, being deflected round and outwardly by the gas cushion and flowing to the individual ports in a substantially horizontal direction.

Alternatively, or in addition, to providing a series of individual ports, the flow of fluid past the recovery ports can be facilitated by making at least the inner edge of the recovery port or ports higher than the edges of the supply port thus giving the recovery port or ports an inclination towards the cushion. According to a further feature of the invention there is provided a vehicle as described above wherein at least the inner edge of each recovery port is raised relative to the edges of the supply port.

The flow of fluid can be even further facilitated if the outer edge of the supply port is lowered relative to the inner edge of the supply port, thus inclining the supply port towards the cushion, each recovery port being at the same level as, or at least its inner edge higher than, the inner edge of the supply port.

Normally, the fluid forming the curtain is a gas, usually air or a mixture of air and exhaust gases. Hereinafter, the curtain will be described as being formed of air, although other gases, or fluids such as water, can be used. Conveniently where the curtain is formed by a gas, the cushion is also of the same gas and hereinafter, for convenience, will be referred to as air.

Figure 2:
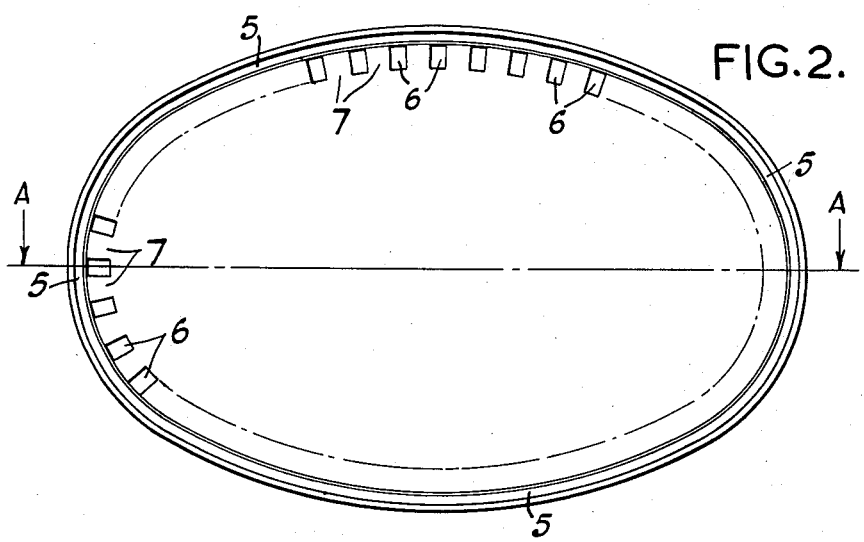
Figure 3:
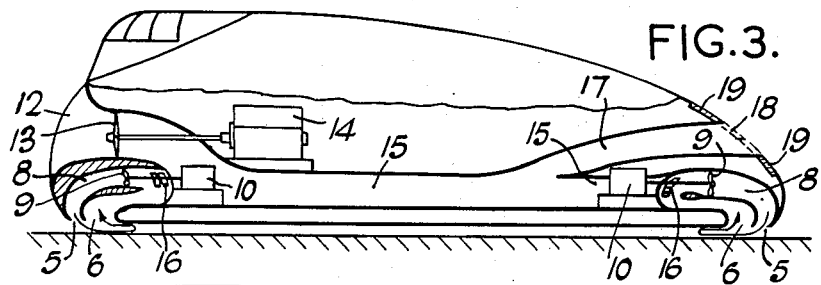
Figure 4:
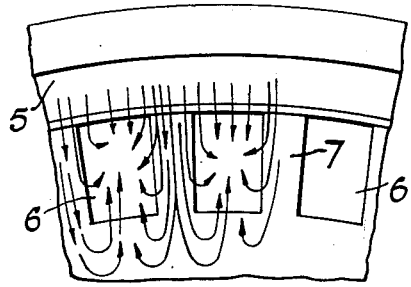
Figure 5:
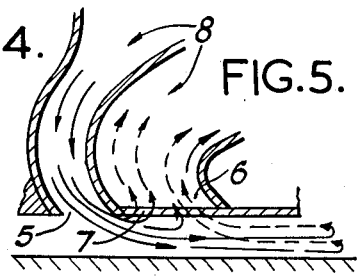

The invention will be readily understood from the following description of certain embodiments, by way of examples, in conjunction with the accompanying drawings in which:

FIGURE 1 illustrates diagrammatically the air flow pattern in a vehicle operating at a low height without embodying the invention, FIGURE 2 is an inverted plan view of a vehicle embodying the invention, FIGURE 3 is a vertical cross-section on the line A—A of FIGURE 2, FIGURE 4 is a part of FIGURE 2 to an enlarged scale, illustrating diagrammatically the air flow pattern, FIGURE 5 is a part of FIGURE 3 to an enlarged scale illustrating diagrammatically the air flow pattern, FIGURE 6 is a fragmentary cross-section, similar to that shown in FIGURE 5, but illustrating a modification thereof, FIGURE 7 is a fragmentary cross-section, similar to FIGURES 5 and 6 but illustrating a further modification thereof, FIGURE 8 is a fragmentary inverted plan view, similar to that of FIGURE 4, but illustrating an alternative form of porting, FIGURE 9 is a fragmentary cross-section, on the line B—B of FIGURE 8, FIGURE 10 is a fragmentary vertical cross-section illustrating a further port arrangement, and FIGURE 11 is a cross-section similar to that of FIGURE 10, illustrating a modification thereof.

In vehicles as described above, the pressure of the cushion results in, and the cushion is contained by, the deflection of the air curtain. For a constant mass flow and constant height, the pressure of the cushion will depend upon the radius of curvature of the curtain, that is, the change in momentum of the air curtain, the smaller the radius of curvature the higher the pressure. The radius of curvature is normally controlled by the height at which the vehicle is to operate and variation of the radius cannot normally therefore be used to vary the cushion pressure. However at low operating heights, particularly at heights less than the horizontal width of the supply port, the normal flow pattern is interfered with, a result somewhat as shown in FIGURE 1 occurring. The air flowing from the supply port 1 must flow through a restricted path, between the bottom of the vehicle and the surface, and this results in a flow of high velocity with a low static head. Further the flow of air tends to impinge on the inner surface of the duct just inside the recovery port 2, instead of being deflected round. The air is thus reflected for only a part of its normal deflection, having a large radius of curvature. There results a low cushion pressure. Where the air which is recovered through the recovery port 2 is normally fed to a fan for re-energising, then the position is likely to be aggravated, as due to the low flow rate of air from the supply port 1 to the recovery port 2, the suction of the fan may cause sub-atmospheric pressures to be formed at the recovery port, decreasing the cushion pressure even further. At extremely low heights and severe restriction of the flow of air from the supply port to the recovery port, it is possible for negative lift to occur.

As stated above, the cushion pressure is dependent, among other things, on the radius of curvature of the air curtain. At low heights, if the curtain can be deflected through a smaller radius an increase in pressure can be obtained to offset pressure reductions for other reasons.

FIGURES 2, 3, 4 and 5 illustrate a vehicle embodying the invention and show one way of improving the recovery of the curtain forming air and also maintaining the cushion pressure. Formed in the bottom of the vehicle and adjacent to the periphery thereof is an annular supply port 5. Also formed in the bottom of the vehicle immediately inboard of the supply port 5 in a series of separate recovery ports 6. Each recovery port 6 is separated from the adjacent port by a portion 7, which is part of the bottom surface of the vehicle. The recovery ports all communicate with one end of a common transfer duct 8, the other end of the transfer duct communicating with the supply port 5. Situated in the transfer duct are energising means for re-energising the recovered air, shown diagrammatically as fans 9 driven by motors 10.

An air intake 12 is situated at the front of the vehicle and air entering the intake passes to a compressor or fan 13 driven by a motor 14. The air from the compressor flows into a supply duct 15 which is positioned inboard of the transfer duct 8. A number of flaps 16 allow communication between the supply duct 15 and the transfer duct 8. A propulsion duct 17 also communicates with the supply duct 15, the propulsion duct ending in a propulsion nozzle 18 at the rear of the vehicle. The propulsion nozzle can be varied in opening, or completely closed, by sliding flaps 19. Other ducts may also be provided, with flaps for controlling their outlets, for providing a sideways thrust and/or turning moment in the vehicle, as disclosed in the U.S. application of Christopher Sydney Cockerell Serial No. 33,025, filed May 31, 1960.

Initially, when the vehicle starts operating, the flaps 16 are opened and air flows from the supply duct 15 into the transfer duct 8. The air flows through the fans 9 being further energised thereby, and issues from the supply port 5 in a downwards and inwards direction in the form of a curtain. A cushion of pressurised air forms beneath the vehicle and the vehicle is supported above the surface. At normal heights the air curtain is deflected round and upwards into the recovery ports. Most of the curtain forming air is recovered and the flaps 16 are almost closed, allowing only sufficient air to pass from the supply duct to the transfer duct to make up for the curtain air lost from the system.

At lower heights, however, such as at take off, the air flows inwards under the bottom surface in direction much closer to the horizontal than when the vehicle is operating at its normal height. Some of the air from the supply port flows inwards over the portions 7 and is deflected round and outwards, in a horizontal plane, back towards the recovery ports 6. The deflected air flows into the recovery ports and tends to prevent the remaining air flowing from the supply port impinging on the inner wall of the recovery port and the recovery of the curtain forming air is more efficient. The inward flowing of the curtain forming air over the portions 7, and its outward deflection by the cushion ensures the formation and maintenance of a cushion at a pressure sufficient to support the vehicle. Although not all of the curtain forming air is deflected directly by the cushion, the part of the air which is deflected is done so through a smaller radius of curvature than when the vehicle is at a normal height. Thus the deflection of a smaller amount of air maintains a normal cushion pressure.

The efficiency of the flow of the curtain fluid to and into the recovery port or ports can be further increased, or the existing efficiency maintained at a lower height, if the inner edge of the recovery port or ports is raised relative to the supply port. This is illustrated in FIGURE 6 which is a cross-section similar to that of FIGURE 5. The bottom 25 of the vehicle is raised relative to the supply port 5 and the portions 7, and the recovery ports 6 are thus inclined at an angle to the horizontal, inwards towards the cushion. The inner edges 26 of the recovery ports 6 are thus higher than both edges of the supply port 5 and the outer edge of the recovery port. It can be seen from FIGURE 6 that the vehicle can approach closer to the surface whilst sufficient deflection of the curtain fluid still occurs and the flow into the recovery port is still reasonably efficient. The necessary deflection of the curtain fluid and reasonable recovery efficiency can be retained at even lower heights if the inner edge of the supply port also is raised relative to the supply port thus inclining the supply port at an angle to the horizontal, inwards towards the cushion. The simplest way of obtaining this is to lower the outer edge of the supply port. FIGURE 7 illustrates a construction in which the inner edge 27 of the supply port is higher than the outer edge 28 of the supply port and in which the inner edges 26 of the recovery port are raised further, being higher than the outer edges of the recovery ports. A vehicle having this configuration of ports is capable of operating at very low heights even down to a height at which the outer edge 28 of the supply port is in contact with the surface.

FIGURES 8 and 9 illustrate diagrammatically a further form of port arrangement in which the air forming the curtain issues from a series of separate supply ports and is recovered through a series of separate recovery ports, the supply and recovery ports alternating, side by side, and being also inclined to the horizontal, towards the cushion. Fluid forming the curtain issues from separate supply ports 30 and is recovered by means of the separate recovery ports 31. The supply and recovery ports are arranged alternately in an annular configuration and are at an angle to the bottom surface of the vehicle as shown in FIGURE 9. Fluid for the curtain is fed via the transfer duct 8, the duct, at each end being formed into separate pipes 32 the lower ends of which connect with the supply ports 30 and the recovery ports 31. The fluid flows inwards from the supply ports towards the cushion and is then bent or deflected round until it is flowing outwards. It then flows into the recovery ports. After entering the recovery ports the fluid flows up the pipes 32 into the transfer duct 8.

A further port arrangement is shown diagrammatically in FIGURE 10 in which both the supply port and the recovery port is annular, the recovery port being above the supply port and facing horizontally inwards. Fluid for the curtain is fed via the transfer duct 8 to an annular supply port 35, arranged to expel the curtain fluid inwardly towards the cushion. The fluid is deflected by the cushion, and flows outwards into an annular recovery port 36 which is situated inboard and above the supply port 35 and faces inwardly. From the recovery port 36 the fluid flows to the transfer duct 8. The recovery port 36 is defined on its upper side by the bottom surface 37 of the vehicle and on its lower side by an extension 38 which extends from the upper edge of the supply port 35. To improve the flow of fluid on one or both sides of the extension 38 it may be shaped in various ways, a typical example of which is illustrated in FIGURE 11.

By the use of constructions such as described above and illustrated in the accompanying drawings, the curtain fluid is more readily able to form and maintain the cushion of pressurized gas at low heights which cushion in turn deflects the curtain fluid more readily. The part of the fluid forming the curtain which is to be recovered, is recovered more efficiently and the stable operation of the vehicle at lower heights is obtained.

The recovered fluid may be used in various ways apart from being recirculated back to the same curtain, such as being used to form a further curtain or used for propulsion.

Where more than one curtain system is formed, for example where two or more substantially parallel curtain systems are formed for at least part of the periphery of the vehicle bottom, it is normally only necessary for the ports for one of the curtain systems, either the inner system or the outer system, to be arranged as described. Both curtain systems may have their ports arranged as described, however, if desired, and the arrangement of one set of ports may vary from the arrangement of the other set of ports.

It will be appreciated that as the height of the vehicle increases the air flow of the curtain will vary, until, when the vehicle is at or near its normal operating height, the air forming the curtain will first flow downwards and inwards to the surface, then bending inwards towards the cushion which further deflects the air upwards and outwards to the necessary port, in the normal manner.

We claim:

1. A vehicle for travelling over a surface which, in operation, is at least partly supported above the surface by a cushion of pressurized gas formed and contained beneath the vehicle by at least one curtain of fluid, comprising at least one supply port in the bottom surface of the vehicle from which the curtain forming fluid issues in a downwards and inwards direction relative to the periphery of the vehicle, and a plurality of discrete peripherally spaced recovery ports in the bottom surface of the vehicle adjacent to and inboard of the supply port through which at least part of the fluid forming the curtain is recovered into the vehicle, the recovery ports being separated by intervening portions of the bottom surface of the vehicle so that, when the vehicle is operating at a low height, at least part of the fluid forming the curtain is caused to flow inwardly beneath said intervening portions of the bottom surface of the vehicle and past the recovery ports until deflected round and outwardly by the gas cushion and to then flow back to the recovery ports in a substantially horizontal direction beneath the bottom surface of the vehicle.

2. A vehicle for travelling over a surface which, in operation, is at least partly supported above the surface by a cushion of pressurized gas formed and contained beneath the vehicle by at least one curtain of fluid comprising at least one supply port in the bottom surface of the vehicle from which the curtain forming fluid issues in a downwards and inwards direction relative to the periphery of the vehicle, at least one recovery port in the bottom surface of the vehicle, at least one recovery port in the bottom surface of the vehicle adjacent the supply port through which at least part of the fluid forming the curtain is recovered into the vehicle, and means for denying at least a part of the fluid flowing from the supply port direct access to the recovery port and thereby causing at least part of the fluid forming the curtain to flow inwardly towards the gas cushion and to be deflected by said cushion so as to flow outwardly towards the recovery port.

3. A vehicle for travelling over a surface which, in operation, is at least partly supported above the surface by a cushion of pressurized gas formed and contained beneath the vehicle by at least one curtain of fluid, comprising at least one annular supply port in the bottom surface of the vehicle from which the curtain forming fluid issues in a downwards and inwards direction relative to the periphery of the vehicle, and a plurality of discrete recovery ports in the bottom surface of the vehicle immediately inboard of the supply port and spaced apart in an annular configuration through which at least part of the fluid forming the curtain is recovered into the vehicle, the recovery ports being spaced from one another by intervening portions of the bottom surface of the vehicle but there being no substantial portion of the bottom surface of the vehicle intervening between the recovery ports and the supply port, whereby, when the vehicle is operating at a low height, part of the fluid forming the curtain is caused to flow inwardly past the recovery ports until deflected round and outwardly by the gas cushion and to then flow back to the recovery ports in a substantially horizontal direction beneath the bottom surface of the vehicle.

4. A vehicle for travelling over a surface which, in operation, is at least partly supported above the surface by a cushion of pressurized gas formed and contained beneath the vehicle by at least one curtain of fluid, comprising a plurality of discrete supply ports formed in the bottom surface of the vehicle from which the curtain forming fluid issues in a downwards and inwards direction relative to the periphery of the vehicle, and a plurality of discrete recovery ports formed in the bottom surface of the vehicle through which at least part of the fluid forming the curtain is recovered into the vehicle, the supply ports and the recovery ports alternating in an annular configuration substantially parallel to the periphery of the vehicle.

5. A vehicle as claimed in claim 4 in which the supply ports and recovery ports are formed at the ends of tubular ducts, positioned side by side, the ports being inclined to the horizontal and facing inwards towards the space occupied by the cushion.

6. A vehicle as claimed in claim 3 wherein the recovery ports are inclined to the horizontal and face inwards towards the space occupied by the cushion.

7. A vehicle as claimed in claim 3 wherein the supply port is inclined to the horizontal and faces inwards towards the space occupied by the cushion.

8. A vehicle for travelling over a surface which, in operation, is at least partly supported above the surface by a cushion of pressurized gas formed and contained beneath the vehicle by at least one curtain of fluid comprising at least one supply port in the bottom surface of the vehicle from which the curtain forming fluid issues in a downwards and inwards direction relative to the periphery of the vehicle, and at least one recovery port in the bottom surface of the vehicle adjacent the supply port through which at least part of the fluid forming the curtain is recovered into the vehicle, each of said supply and recovery ports consisting of a plurality of discrete ports, the discrete supply ports and the discrete recovery ports alternating in an annular configuration.

9. A vehcle as claimed in claim 8 including a plurality of tubular ducts leading to the discrete supply and discrete recovery ports and positioned side by side within the vehicle, and wherein all of said discrete ports are inclined to the horizontal and face inwards towards the space occupied by the cushion.

10. A vehicle for travelling over a surface which, in operation, is at least partly supported above the surface by a cushion of pressurized gas formed and contained beneath the vehicle by at least one curtain of fluid comprising at least one annular supply port in the bottom surface of the vehicle from which the curtain forming fluid issues in a downwards and inwards direction relative to the periphery of the vehicle, and a plurality of discrete recovery ports in the bottom surface of the vehicle, positioned immediately inboard of the supply port and spaced apart in an annular configuration, through which at least part of the fluid forming the curtain is recovered into the vehicle.

11. A vehicle for travelling over a surface which, in operation, is at least partly supported above the surface by a cushion of pressurized gas formed and contained beneath the vehicle by at least one curtain of fluid comprising at least one supply port in the bottom surface of the vehicle from which the curtain forming fluid issues in a downwards and inwards direction relative to the periphery of the vehicle, and at least one recovery port in the bottom surface of the vehicle adjacent the supply port through which at least part of the fluid forming the curtain is recovered into the vehicle, the inner edge of one of said ports being higher than the outer edge thereof so that said port is inclined to the horizontal and faces inwards towards the space occupied by the cushion.

12. A vehicle as claimed in claim 11 wherein the inner edge of the recovery port is higher than both edges of the supply port and the outer edge of the recovery port.

13. A vehicle as claimed in claim 11 wherein the inner edge of the supply port is higher than the outer edge of said port.

References Cited by the Examiner
UNITED STATES PATENTS 2,838,257   6/58   Wibault.

FOREIGN PATENTS 1,240,721   8/60   France.

OTHER REFERENCES

Publication, "Symposium on Ground Effect Phenomena," Oct. 21–23, 1959; page 141 relied on.

A. HARRY LEVY, *Primary Examiner.*

PHILIP ARNOLD, *Examiner.*

UNITED STATES PATENT OFFICE
CERTIFICATE OF CORRECTION

Patent No. 3,165,159 January 12, 1965

Wilfred James Eggington et al.

It is hereby certified that error appears in the above numbered patent requiring correction and that the said Letters Patent should read as corrected below.

Column 1, line 20, for "application" read -- applications --; column 3, line 5, for "reflected" read -- deflected --; column 5, lines 63 and 64, strike out ", at least one recovery port in the bottom surface of the vehicle"; column 6, line 60, for "vehcle" read -- vehicle --.

Signed and sealed this 13th day of July 1965.

(SEAL)
Attest:

ERNEST W. SWIDER
Attesting Officer

EDWARD J. BRENNER
Commissioner of Patents